(12) United States Patent
Vafaei

(10) Patent No.: US 7,035,257 B2
(45) Date of Patent: Apr. 25, 2006

(54) SYSTEM AND METHOD TO DISCOVER AND CONFIGURE REMOTELY LOCATED NETWORK DEVICES

(75) Inventor: Amir Vafaei, Maple Grove, MN (US)

(73) Assignee: Digi International, Inc., Minnetonka, MN (US)

( * ) Notice: Subject to any disclaimer, the term of this patent is extended or adjusted under 35 U.S.C. 154(b) by 329 days.

(21) Appl. No.: 10/295,268

(22) Filed: Nov. 14, 2002

(65) Prior Publication Data

US 2004/0095897 A1 May 20, 2004

(51) Int. Cl.
*H04L 12/28* (2006.01)

(52) U.S. Cl. .................. 370/389; 370/392; 709/228
(58) Field of Classification Search ................ 370/352, 370/353, 354, 389, 390, 392, 395.52, 400, 370/401, 338, 256, 252, 398.53, 601; 709/203, 709/223, 224, 227, 228, 217
See application file for complete search history.

(56) References Cited

U.S. PATENT DOCUMENTS

| | | | | | |
|---|---|---|---|---|---|
| 5,854,901 | A | * | 12/1998 | Cole et al. ................... | 709/245 |
| 6,081,512 | A | * | 6/2000 | Muller et al. ................ | 370/256 |
| 6,249,814 | B1 | * | 6/2001 | Shaffer et al. .............. | 709/223 |
| 6,636,499 | B1 | * | 10/2003 | Dowling ...................... | 370/338 |
| 6,694,369 | B1 | * | 2/2004 | Vepa et al. .................. | 709/228 |

OTHER PUBLICATIONS

*Digi Port Authority—Remote: Setup Guide*, Digi International, Inc., obtained from ftp://ftp.digi.com/support/manuals/old/900000248_C/9200038_A.pdf,(Jan. 31, 2002),28 p.

*PortServer TS 8/16: Configuration and Administration Guide*, Digi International, Inc., obtained from ftp:/ftp.digi.com/support/manuals/old/90000248_C/92000307_C.pdf, (Nov. 12, 2002),79 p.

Perkins, C. E., et al., "DHCP for IPv6", *Proceedings of the Third IEEE Symposium on Computers and Communications*, (Jun. 30, 1998),493–497.

Al-Shaer, E., et al., "Toward Integrating IP Multicasting in Internet Network Management Protocols", Computer Communications, 24, (Mar. 15, 2001),473–785.

* cited by examiner

*Primary Examiner*—Phirin Sam
(74) *Attorney, Agent, or Firm*—Schwegman, Lundberg, Woessner & Kluth, P.A.

(57) ABSTRACT

To permit discovery and configuration of a remotely located network server element by a client element of a local network device, the client sends a multicast discovery protocol request packet. The server element may monitor packets received at a pre-configured discovery protocol port of the server for the discovery protocol request packet. When the discovery protocol request packet is received at the discovery protocol port, the server element may validate the discovery protocol request packet by comparing a portion of a header with a predetermined value, and may perform an action requested by the discovery protocol request packet. The server element may also unicast a discovery protocol reply packet to the client indicating a response to the requested action. When the discovery protocol request packet is valid, the method determines whether the action requested is a query request, a configuration request, or a remote reboot request based on a message type portion of the header of the discovery protocol request packet. In one embodiment, the discovery protocol reply packet unicasted to the client may indicate the information requested by the query request, whether a configuration was performed in accordance with the configuration request, or whether the server element agrees to reboot in accordance with the remote reboot request.

28 Claims, 6 Drawing Sheets

SYSTEM AND METHOD TO DISCOVER AND CONFIGURE REMOTELY LOCATED NETWORK DEVICES

TECHNICAL FIELD

The present invention pertains to network communications, and in particular, to discovery and configuration of network devices.

BACKGROUND

Customers purchasing a network device may install it on a network supported by a dynamic host configuration protocol (DHCP) server. The DHCP server may assign the network device an address for network communications. The network address assigned by a DHCP server is generally not known externally and may change often. One problem is determining the assigned network address for use in configuring and connecting with the network device. This is especially a problem for network devices operating in remote locations or operating in locations that are not easily accessible.

Network devices may also be installed on networks not supported by DHCP server. In some cases, these devices may be misconfigured. Examples of such networks may include private networks. As a result, such network devices may not have an assigned address and/or may not be able to effectively communicate on the network. Accordingly, discovering and configuring such network devices can be difficult, especially for network devices operating in remote locations or operating in locations that are not easily accessible.

Conventional methods used to discover and configure remotely located network devices typically require a direct (e.g., non-network) connection with the device. These methods are often cumbersome and inefficient. Examples of such direct connections include connections through a serial port utilizing a telephone line.

Thus, there is a general need for an improved method and apparatus that can discover and configure network devices. There is also a general need for a method and apparatus that can communicate with and configure a network device that does not have an assigned IP address. There is also a general need for a method and apparatus that can communicate with and configure a remote network device that may be misconfigured. There is also a general need for a method and apparatus that can communicate with and configure a remote network device without a direct connection, such as a serial connection, to the network device. There is also a general need for a method and apparatus that can determine configuration settings of a remote network device. There is also a general need for a method and apparatus that can reboot a remote network device.

SUMMARY

To permit discovery and configuration of a remotely located network device, a discovery protocol client multicasts a discovery protocol request packet. A discovery protocol server element of the remotely located network device may monitor packets received at a pre-configured discovery protocol port for the discovery protocol request packet. When a discovery protocol request packet is received at the discovery protocol port, the server element may validate the discovery protocol request packet by comparing a portion of a header with a predetermined value, and may perform an action requested by the discovery protocol request packet. The server element may also unicast a discovery protocol reply packet to the client indicating a response to the requested action.

In one embodiment, the method may include determining, when the discovery protocol request packet is valid, whether the action requested is a query request, a configuration request, or a remote reboot request based on a message type portion of the header of the discovery protocol request packet. In this embodiment, the discovery protocol reply packet unicasted to the client may indicate either information requested by the query request, whether a configuration was performed in accordance with the configuration request, or whether the server element agrees to reboot in accordance with the remote reboot request.

In one embodiment, prior to unicasting the discovery protocol reply packet, the method may include temporarily configuring the remotely located network device as a gateway when an IP address of the network device is not on the same subnet as the requesting client, and when the network device has no valid gateway access to the requesting client. In this embodiment, an indication may be provided in the discovery protocol reply packet that the network device is misconfigured.

In one embodiment, monitoring for discovery protocol multicast packets may include checking a multicast address and a UDP port number of received multicast packets for a predetermined multicast address and predetermined UDP port number. In this embodiment, the predetermined UDP port number may correspond with the pre-configured discovery protocol port of the network device.

For a configuration request or a remote reboot request, the method may include further validating the discovery protocol request packet by comparing a MAC address identified in the discovery protocol request packet with a MAC address of the receiving network device. For a query request, the method may include further validating the discovery protocol request packet by comparing the MAC address identified in the discovery protocol request packet with either the MAC address of the receiving network device or a predetermined broadcast address.

In various embodiments, the server element initially registers with a gateway to permit receipt of multicast packets in accordance with the discovery protocol. The multicast packets of the discovery protocol may have a predetermined multicast address and may indicate a predetermined UDP port number. The server element of the remotely located network device may bind with the predetermined UDP port for receipt of the multicast packets in accordance with the discovery protocol. In one embodiment, the server element registers with an IGMP to permit receipt of multicast communications behind a router in accordance with the discovery protocol.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

The present invention provides, in embodiments, an improved method and apparatus that can discover and configure network devices. In embodiments, the present invention also provides a method and apparatus that can communicate with and configure a network device that does not have an assigned IP address. In embodiments, the present invention also provides a method and apparatus that can communicate with and configure a remote network device that may be misconfigured. In embodiments, the present invention also provides a method and apparatus that can communicate with and configure a remote network device without a direct connection, such as a serial connection, to the network device. In embodiments, the present invention also provides a method and apparatus that can determine configuration settings of a remote network device. In embodiments, the present invention also provides a method and apparatus that can reboot a remote network device.

Figure 1:
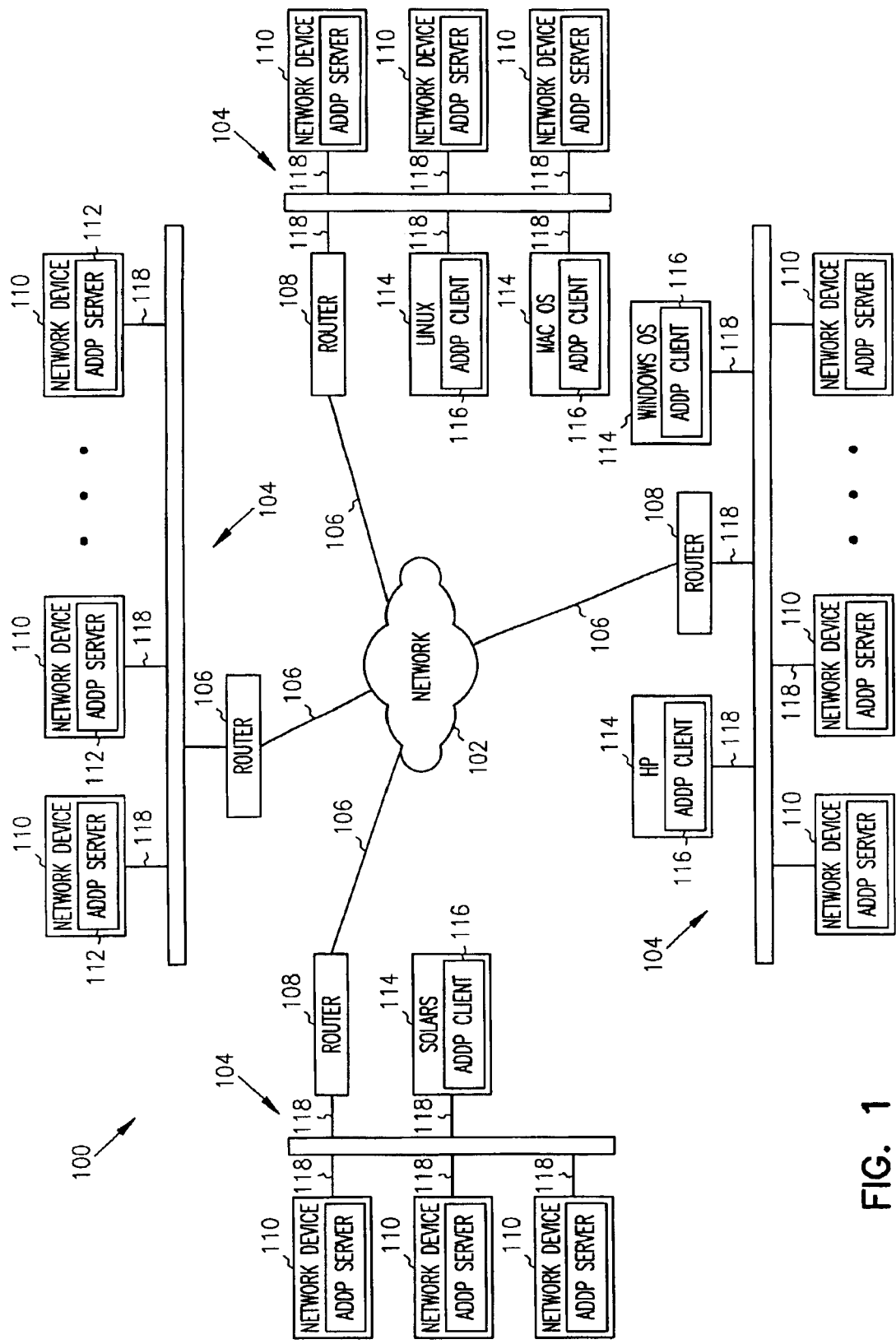
FIG. 1 illustrates an operational environment in which embodiments of the present invention may be practiced.

FIG. 1 illustrates an operational environment in which embodiments of the present invention may be practiced. Operational environment 100 includes network 102 coupling one or more sub-networks 104 with communication links 106. Sub-networks 104 may include routers 108 for routing communication packets between network 102 and network devices 110, and for routing communication packets among the network devices of a particular sub-network 104. Network devices 110 of a particular sub-network 104 may communicate therebetween and with router 108 using communication links 118. Some or all of network devices 110 may include discovery protocol server element 112. Some sub-networks 104 may also include one or more network devices 114 which may include discovery protocol client element 116. Discovery protocol server element 112 and discovery protocol client element 116 may operate in accordance with a discovery protocol described herein to permit communication with a particular one of network devices 110, as well as permit discovery and configuration of a particular one of network devices 110 having a discovery protocol server element operating therein.

Each of network devices 110 and 114 may be comprised of a computing platform running almost any operating system (OS), including, for example, a Linux OS, an HP OS, a Solaris OS, a Macintosh OS, a Windows OS, or a Unix OS, only some of which are illustrated.

Network devices 110 and 114 on different subnets 104 may communicate with each through over network 102, and may utilize a network communication technique that may include the use of one or more predetermined protocols. In one embodiment, network 102 may be either a local area network (LAN) or a wide area network (WAN) and may implement Ethernet communications. In another embodiment, network 102 or portions thereof, may be a wireless LAN and may implement wireless communication techniques, including wireless communications in accordance with one or more of the IEEE 802.11 standards. In yet other embodiments, network 102 may be a transmission control protocol/internet protocol (TCP/IP) network such as the Internet or an intranet, or may be a network implementing a universal datagram protocol (UDP) communication technique. Network 102 may also provide communications with other network devices that are not illustrated.

In one embodiment, a particular subnet address range may define each sub-network 104 such that network devices 110 and 114 of a particular subnet may have network addresses within their subnet address range. Accordingly, router 108 for a particular subnet 104 may detect and forward packets from network 102 having a destination address within the subnet address range. Each network device 110, 114 may be identified by a unique address, such as an IP address, which may be assigned by a dynamic host configuration protocol (DHCP) server (not illustrated). Misconfigured network devices may have an invalid IP address, such as when the subnet address is out of range or for another subnet. In this case, the IP address may not be recognizable by the router of the subnet.

Figure 2:
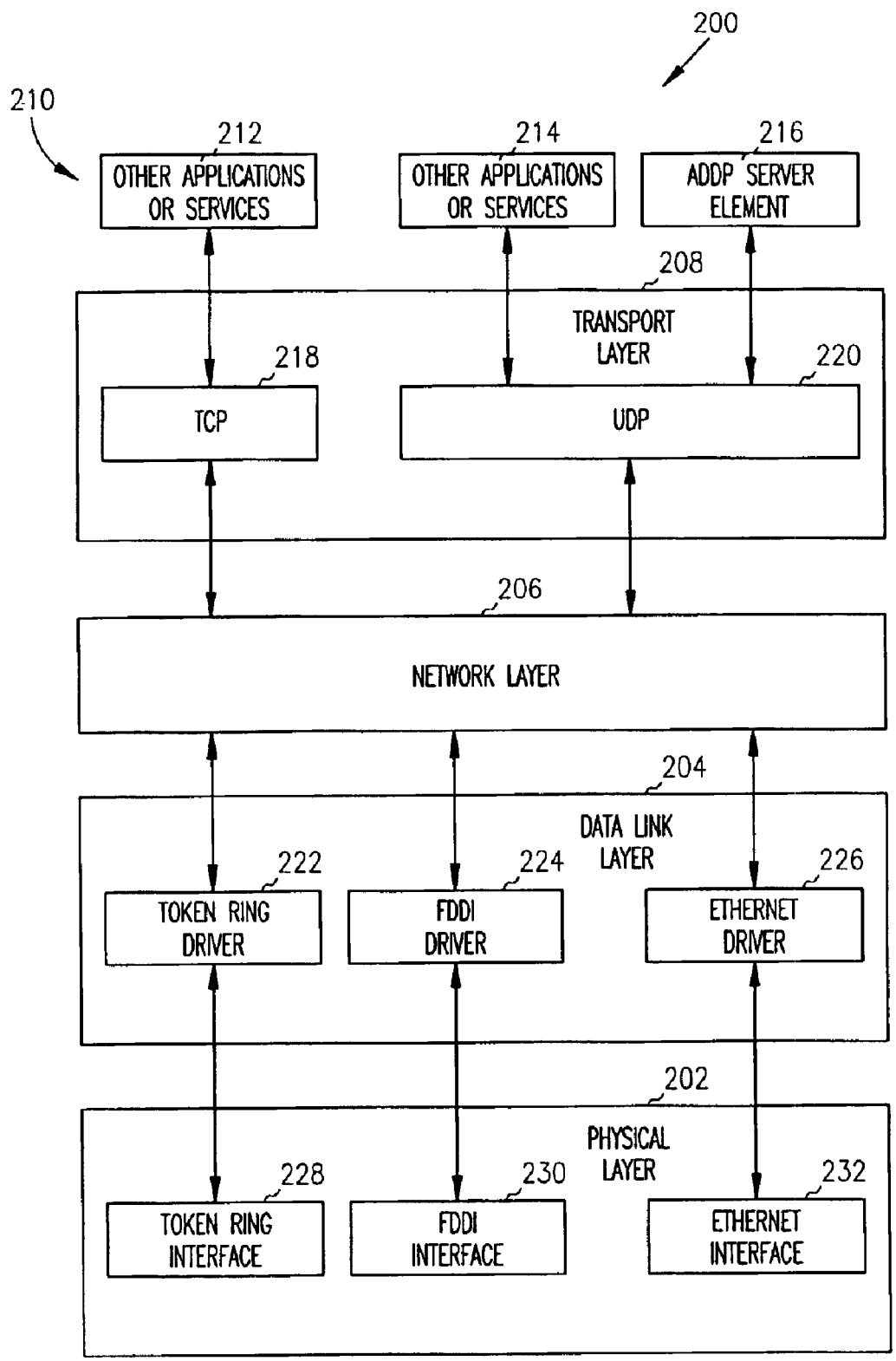
FIG. 2 is a functional block diagram of a network device in accordance with an embodiment of the present invention.

FIG. 2 is a functional block diagram of a network device in accordance with an embodiment of the present invention. Network device 200 may be suitable for use as one of network devices 110 (FIG. 1) although other devices may also be suitable. Network device 200 may be a computing platform or digital computing device and may include physical layer 202, data-link layer 204, network layer 206, transport layer 208 and applications 210. Layers 202 through 208 may be considered layers of a protocol stack, such as a stack in accordance with an open systems interconnection (OSI) model. Physical layer 202 may include electrical and mechanical elements for communication with other devices over various transmission mediums. Physical layer 202 may include several interfaces, including network interfaces and non-network interfaces such as a serial interface. In one embodiment, physical layer 202 may include Ethernet interface 232 for WAN or LAN communications, fiber distributed data interface (FDDI) 230 and/or token ring interface 220. Physical layer 202 may include other interfaces, including wireless interfaces not illustrated. Data link layer 204 may include one or more drivers to coordinate communications between physical layer 202 and network layer 206. In the embodiment illustrated, data link layer 204 includes Ethernet driver 226, FDDI driver 224 and token ring driver 222 to coordinate communications between the respective interfaces of physical layer 202. In one embodiment, Ethernet driver 226 provides communications over communication links 118 (FIG. 1).

Network layer 206 may provide an interface between the various drivers of data link layer 204 and various elements of transport layer 208 allowing data packets to be communicated between any interface and any transport layer element. In one embodiment, transport layer 208 may include TCP element 218 and UDP element 220 for communication of TCP and UDP packets respectively. TCP element 218 and UDP element 220 may communicate protocol packets with certain applications and services 212 and 214 operating on network device 200. In one embodiment, network layer 206 implements the Internet Protocol (IP).

In accordance with embodiments of the present invention, applications 210 includes discovery protocol server element 216 operating on network device 200. Discovery protocol server element 216 may communicate through a particular UDP port through UDP element 220.

In accordance with embodiments of the present invention, a discovery protocol implemented in part by discovery protocol server element 216 and discovery protocol client element 116 (FIG. 1) may discover and configure network capable devices on a network. The discovery protocol may use applications, which can run on any platform or operating system (OS), that are configured for multicast communication on a network and communicating with discovery protocol server element 216 in network device 200. The discovery protocol of various embodiments of the present invention may be especially helpful for network devices that may not have an IP address assigned to them, or network devices that are misconfigured on a subnet, such as sub-network 104 (FIG. 1). Such network devices are normally unable to communicate on a network before a valid IP address for their subnet is assigned to them. Being able to configure network devices over a network may ease a customer's job by not requiring the customer to connect the device through cumbersome means, such as a serial terminal connection, in order to configure network parameters.

In accordance with one embodiment, the discovery protocol implemented by server element 216 is a UDP based protocol and communicates through a predetermined UPD port configured by UDP element 220. Discovery protocol server element 216 registers the network device with, for example, an Internet group management protocol (IGMP) to receive multicast communications over a selected multicast address. This enables the network device to receive multicast communications behind routers, such as one of routers 108 (FIG. 1). The multicast address may be selected from available addresses, for example, as identified in request for comment (RFC) 1700. In one embodiment, a predetermined multicast address may be used. For example, RFC 1700 identifies addresses ranging from 224.0.5.128 through 224.0.5.255 and 224.0.6.128 through 224.0.6.255, which may be currently unassigned, that are suitable for use. One or more addresses may be assigned for such use by the Internet assigned numbers authority (LANA). After registration with IGMP, server element 216 may bind to a well-known or predetermined UDP port number, herein referred to as a discovery protocol port (ADDP_PORT). In one embodiment, UDP port number 2362, which has been assigned to Digi International by IANA, may be used.

Once bound to a UDP port number, server element 116 may listen for incoming multicast request packets having the proper multicast address. Once a request is received, server element 216 may check to see if the request is intended to be processed by this particular network device. This is because, in some embodiments, many network devices may be configured to listen for the same multicast address. In one embodiment, server element 216 may compare a MAC address included in a data portion of the multicast packet, against an "all devices" address (e.g., 0xFFFFFFFFFFFF) or against the network device's manufacturing assigned MAC address. If a match is found, the multicast request packet may be intended for that particular network device and the request may be processed. If a match is not found, the request may be discarded. When the request is processed, the information requested, if any, or the result of a requested operation, may be sent to the requester, by a unicast reply packet. Accordingly, a user of a client device may request the current configuration of a network device, and/or reconfigure the network device.

In one embodiment, the protocol may be used to detect whether a network device is on its current subnet by comparing it's own IP address and subnet mask, with the requestor's IP address and subnet mask. If different, server element 216 may check whether there is a route to the requestor (e.g., client element 116 (FIG. 1)), or if a valid default gateway is defined. When no route or valid default gateway is defined, the server element may determine that its network device is misconfigured. When there is a route to the requestor or a default gateway defined, the server element may check to see if the gateway responds by pinging it's IP address, or sending address resolution protocol (ARP) requests for the gateway. If no response is received, the server device may also determine that its network device is misconfigured.

When a network device, such as network device 200, determines that it is misconfigured, it may assume that the requestor is on the same subnet because the network device received the multicast discovery protocol request packet. In this case, a temporary route to the requestor may be created or alternatively, the default gateway may be temporarily modified to be the requestor's IP address. After that a discovery protocol reply packet is sent to the requester, the temporary route may be removed.

In at least one embodiment, network device 200 may be suitable for one of network devices 114 when a client element, such as client element 116 (FIG. 1) is included as one of applications 210. In this embodiment, server element 216 may not be required. Although device 200 is illustrated as having several separate functional elements, one or more of the functional elements may be combined and may be implemented by combinations of software configured elements, such as processors including digital signal processors (DSPs), and/or other hardware elements.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof. Moreover, as used herein, data refers to one or more storage data elements, which can include portions of files, a single file, a file extent, a database, a storage device partition, a volume, sets of volumes and the like. The data need not reside on a single storage device and may span multiple storage devices.

Figure 3A:
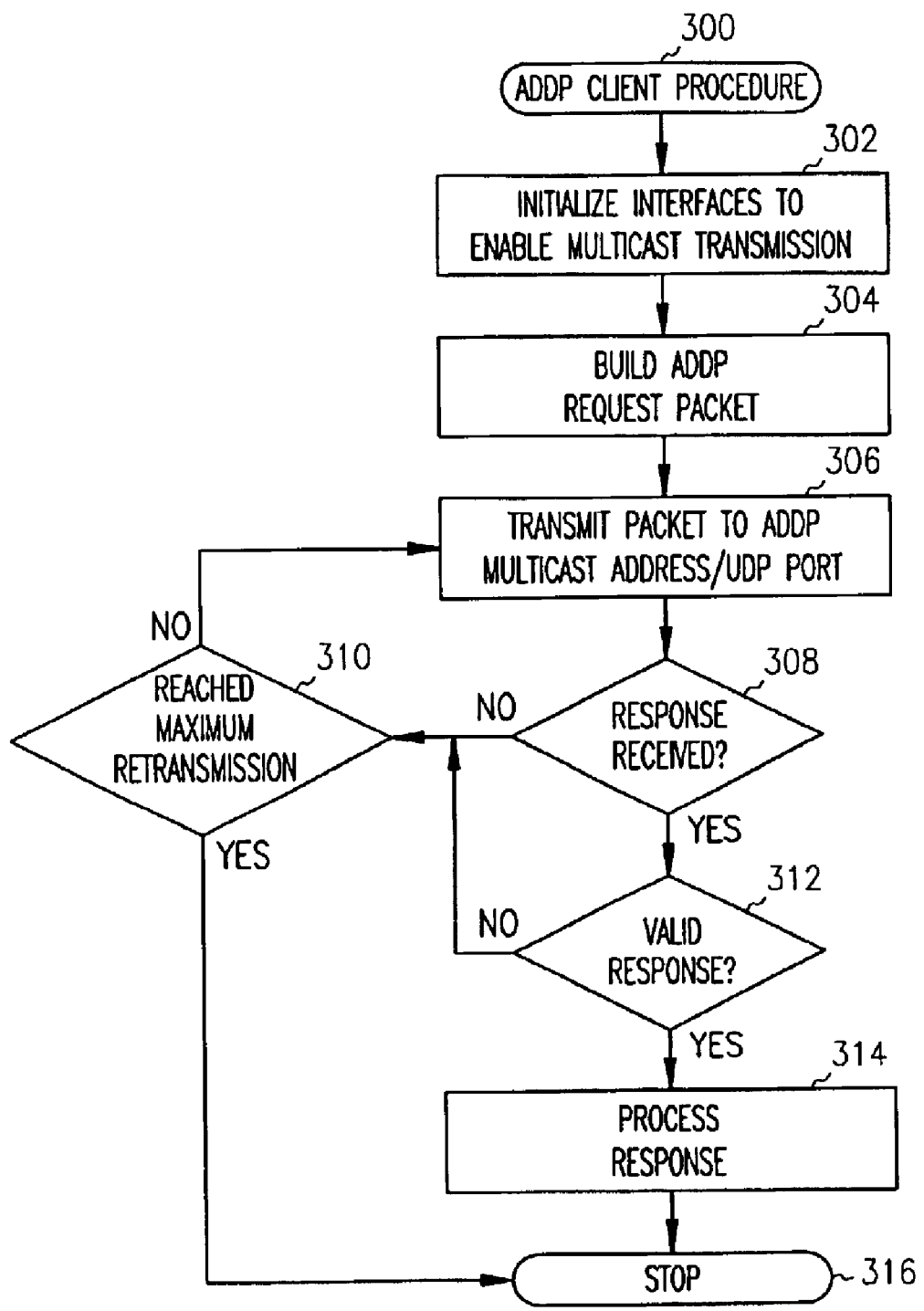
FIG. 3A is a flow chart of a discovery protocol client procedure in accordance with an embodiment of the present invention.

FIG. 3A is a flow chart of a discovery protocol client procedure in accordance with an embodiment of the present invention. Discovery protocol client procedure 300 may be performed by a local network device. The local network device may include a discovery protocol client element, such one of network devices 114 (FIG. 1). Procedure 300 may be performed by a client application on any OS capable of network communication. By performing procedure 300, a client element operating on a local network device may request configuration information from remote network devices, may communicate with remote misconfigured network devices, may configure remote network devices, and/or may reboot a remote network device. Although the individual operations of procedure 300 are illustrated and described as separate operations, one or more of the individual operations may be performed concurrently and nothing requires that the operations be performed in the order illustrated.

In operation 302, one or more interfaces of the local network device are initialized to enable multicast transmission. In one embodiment, operation 302 may include setting a mode on an Ethernet driver to allow an Ethernet interface to send a multicast packet or a broadcast packet. Multicast and broadcast packets are packets addressed to be received by more than one or multiple devices.

In operation 304, the client element builds a multicast request packet, which may be in accordance with a discovery protocol as described herein. The multicast request packet built in accordance with a discovery protocol may be a multicast datagram.

Figure 3B:
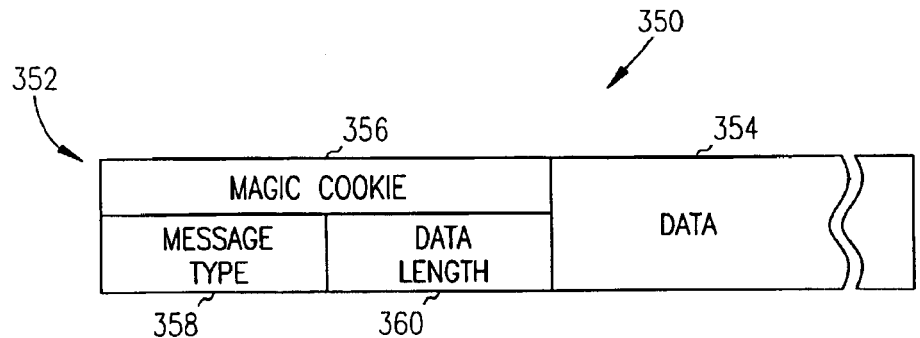
FIG. 3B illustrates portions of a discovery protocol packet in accordance with an embodiment of the present invention.

FIG. 3B illustrates portions of a discovery protocol packet in accordance with an embodiment of the present invention. Discovery protocol packet 350 may include discovery protocol header portion 352 followed by data portion 354. In the case of a discovery protocol request packet, data portion 354 may include request specific data. Header portion 352 may include magic cookie 356 used to validate the header or packet, message type 358 to identify the information in data portion 354, and data length 360 to indicate the length of data portion 354 following header portion 352. Magic cookie 356 may be a predetermined value or pattern of bites that are easily identified and known to both the discovery protocol client elements as well as the discovery protocol server elements.

The message type for request packets may, for example, include: a request for configuration parameters which may be identified by a value of "ADDP_CONF_REQ"; a configure network parameters request which may be identified by a value of "ADDP_SET_ADDR"; or a request to reboot which may be identified by a value of "ADDP_REBOOT". The message type for reply packets may, for example, include: a reply of configuration parameters which may be identified by a value of "ADDP_CONF_REPLY"; a result of a request to configure network parameters which may be identified by a value of "ADDP_SET_ADDR_REPLY"; or a result of a reboot request which may be identified by a value of "ADDP_REBOOT_REPLY". Other messages types for request and reply packets may also be used.

Returning to FIG. 3A, in accordance with operation 304, the discovery protocol request packet may be built to include a particular message type depending on whether the client element is requesting configuration information from the server element, setting configuration parameters of the network device of the server element, or requesting the server element's network device to reboot. In addition, operation 304 may build the discovery protocol request packet to include, as part of the IP header, a predetermined multicast address and predetermined UDP port number (e.g., ADDP_PORT). In the case of request to configure or requests to reboot, a MAC address of the recipient may be included in data portion 354. In the case of query requests (e.g., requests for configuration information), the MAC address of the recipient or a predetermined broadcast address may be included. In the case of request to configure or requests to reboot, a password may also be included for authorization. In one embodiment, the data following the header may interpreted as a series of arguments required for the particular message type.

In operation 306, the network device, such as network device 114 (FIG. 1) sends the multicast protocol request packet (which may be a multicast datagram) to the predetermined multicast addresses for receipt at the discovery protocol port (ADDP_PORT) of network devices, such as network devices 110 (FIG. 1).

In operation 308, the network device may wait to receive a response to the multicast protocol request packet. The response may be in the form of a protocol reply packet generated by a server element of a remote network device. The reply packet may be a unicast datagram sent to the client element. When a reply is not received after a predetermined period of time, the request packet may be resent. Operation 310 may limit a number of times the request packet may be sent. When a response is received, operation 312 validates the response. Operation 312 may check magic cookie 352 of a reply packet by comparing its value/pattern with the predetermined value/pattern. Operation 312 may also perform a byte check by verifying that the received number of bytes of the reply packet match the data length indicated by data length 360 added with the header length. The network stack of the local network device may determine the received number of bytes.

When the response is determined not to be valid in operation 312, the request packet may be retransmitted in operation 306 when a maximum number of retransmissions have not be reached as determined by operation 310. When the response is validated in operation 312, operation 314 may be performed in which the response is processed. In operation 314, information from the reply packet may be stored, displayed and/or provided for a user. For example, the received configuration information may be provided, an indicator to indicate misconfiguration of the network device may be provided, an indicator to indicate when the remotely network device was configured by the request packet may be provided, or an indicator to indicate that the network device was rebooted may be provided. The information received in a discovery protocol reply packet may be used in many ways, including automatically replying (e.g., with another request packet) to a request to configure or request to reboot when a network device is not configured or misconfigured. In operation 316, procedure 300 may terminate until re-initiated by the client element.

In one embodiment, a request for configuration parameters (e.g., ADDP_CONF_REQ) message type requests configuration parameters from either a specific network device using its MAC address, or from all network devices on the network. A client multicasts this request on the network. The data following the header may, for example, be 6 octets, containing either a specific MAC address, or an "all devices" address such as 0xFFFFFFFFFFFF. The server may send the requested information in a reply datagram with the message type set to ADDP_CONF_REPLY, with the requested data following the header portion. Advisory indication (e.g., ADDP_ADVISORY) information may also be included in the reply. For example, if the remote device determines that it is misconfigured on the network, it may advise the client with an advisory indication.

In one embodiment, a request to configure network parameters (e.g., ADDP_SET_ADDR) message type may be used to pass a set of network configuration parameters to a remote network device. The data portion of the message may, for example, contain the following parameters:

| Field | Length |
|---|---|
| IP Address | 4 |
| Submask | 4 |
| Gateway Address | 4 |
| Mac Address | 6 |
| Password Length | 1 |
| Password String | Variable |

The server element may reply to this request with the message type set to ADDP_SET_ADDR_REPLY. The data portion of the reply packet may indicate the result of the requested operation. In one embodiment, the reply message may contain codes to indicate success or failure of the operation and a MAC address of the sending device. For example, the reply message may include ADDP_RESULT, ADDP_MSG, and/or ADDP_MAC type codes. ADDP_RESULT may be ADDP_SUCCESS or ADDP_FAIL. The ADDP_MSG may include a text string indicating the reason for failure, or a success message. In one embodiment, the client element may verify that the reply received is for the proper request by checking the MAC address returned in the reply datagram.

In one embodiment, to reboot a remotely located network device, a request to reboot (e.g., ADDP_REBOOT) message type may be used. In this embodiment, the data portion of the request packet may include the following parameters:

| Field | Length |
|---|---|
| Mac Address | 6 |
| Password Length | 1 |
| Password String | Variable |

The server element may reply to this request with the message type set to ADDP_REBOOT_REPLY, followed by data representing the result of this operation. In one embodiment, the reply message may indicate success or failure of the requested reboot operation, may include a reason for failure and may include the MAC address of the sending network device. For example, the reply may include ADDP_RESULT, ADDP_MSG, and ADDP_MAC type codes. ADDP_RESULT may be ADDP_SUCCESS or ADDP_FAIL. The ADDP_MSG may include a text string indicating the reason for failure, or a success message. The client may verify that the reply received is for the proper request, by checking the MAC address returned in the reply datagram.

Figure 3C:
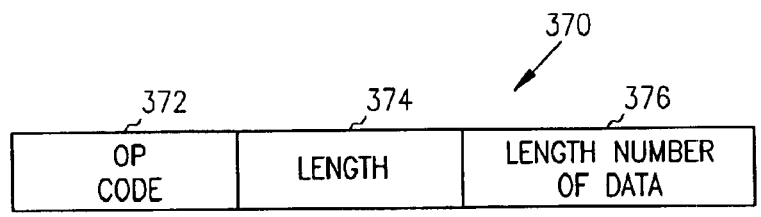
FIG. 3C illustrates a format for parameters of a discovery protocol reply message in accordance with an embodiment of the present invention

FIG. 3C illustrates a format for parameters of a discovery protocol reply message in accordance with an embodiment of the present invention. Reply message parameters 370 may part of data portion 354 of a reply packet. Reply message parameters 370 may include OP code 372, length field 374 and length number of data filed 376. The reply message may contain any number of OP codes as needed. Below are examples of some OP codes suitable for use with embodiments of the present invention.

| OP Code | Value | Length | Description |
|---|---|---|---|
| ADDP_PAD | 0 | 0 | A no op field. Used for aligning start of the next op code if needed. |
| ADDP_MAC | 1 | 6 | Mac address of unit |
| ADDP_IPADDR | 2 | 4 | IP Address |
| ADDP_SUBMASK | 3 | 4 | Submask |
| ADDP_NAME | 4 | n | Non null terminated unit name |
| ADDP_DOMAIN | 5 | n | Non null terminated domain name |
| ADDP_HWTYPE | 6 | 1 | Type of Hardware |
| ADDP_HWREV | 7 | 1 | Hardware Revision |
| ADDP_FEPREV | 8 | n | Non null terminated string with firmware information |
| ADDP_MSG | 9 | n | A message string. |
| ADDP_RESULT | 10 | 1 | Result code for an operation |
| ADDP_GATEWAY | 11 | 4 | Gateway address |
| ADDP_ADVISORY | 12 | 2 | Advisory Info |

A length of "n" indicates a variable length, which may range up to 255. The following table lists examples of result types for the "ADDP_RESULT" OP code.

| Result Type | Value |
|---|---|
| ADDP_NO_ERROR | 0 |
| ADDP_AUTH_FAIL | 1 |
| ADDP_HAS_ADDR | 2 |

The following table lists examples of advisory types for the "ADDP_ADVISORY" OP code.

| Advisory Type | Value |
|---|---|
| ADDP_MIS_CONFIGURED | 1 |

Figure 4:
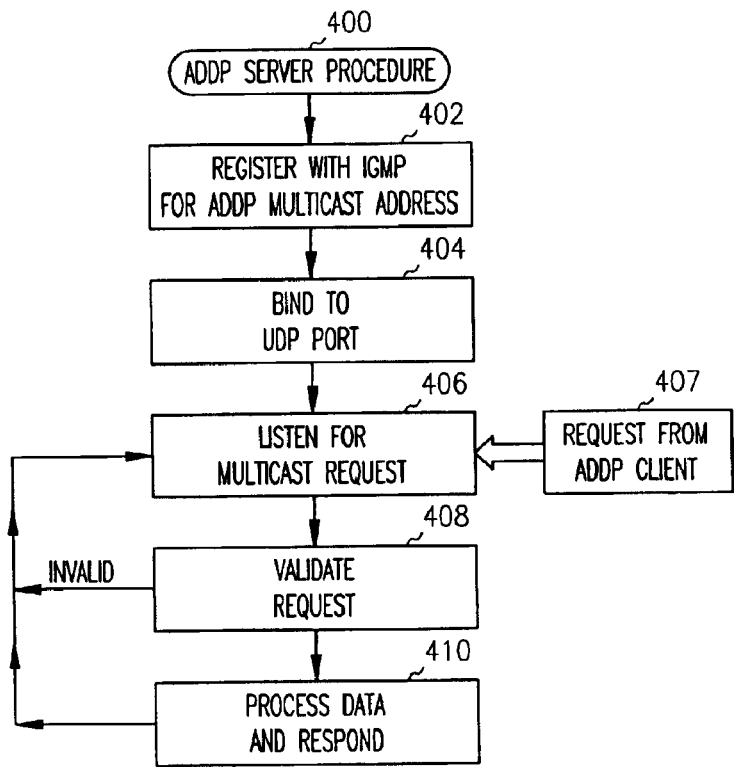
FIG. 4 is a flow chart of a discovery protocol server procedure in accordance with an embodiment of the present invention.

FIG. 4 is a flow chart of a discovery protocol server procedure in accordance with an embodiment of the present invention. Discovery protocol server procedure 400 may be performed by a server element such as server element 200 (FIG. 2) as part of a remote network device, although other elements and devices may also be suitable. In accordance with procedure 400, a network device with a server element may be configured to receive discovery protocol multicast request packets, perform an action in response to receipt of a discovery protocol request packet, and send a discovery protocol reply packet to the requesting network device. A remote network device may perform procedure 400 when it is not assigned a network address or when it is improperly or misconfigured. Although the individual operations of procedure 400 are illustrated and described as separate operations, one or more of the individual operations may be performed concurrently and nothing requires that the operations be performed in the order illustrated.

In operation 402 the server element may register with an external entity, such as the IGMP, to receive multicast communications. As part of operation 402, the server element may be provided a particular multicast address and a predetermined UDP port number.

In operation 404, the server element may bind to the predetermined UPD port for receipt of multicast packets in accordance with the discovery protocol described herein. In operation 406, the server element may monitor packets on its network for discovery protocol request packets. In one embodiment, when server element is located on a subnet, such as one of subnets 104 (FIG. 1), a router associated with the subnet, may route the multicast packets to network devices of its subnet. In this case, the router may have been informed in operation 404 that it has a network device registered to receive certain multicast communications.

In operation 407, a discovery protocol request packet may be received from a requesting client. In operation 408, the server element may initially validate the received discovery protocol request packet. Operation 408 may include validating the magic cookie in the header and may include checking a measured length with length information in the header. When the request packet is invalid, it may be ignored and the server element may continue to listen for other discovery protocol multicast request packets.

Operation 410 is performed when a discovery protocol multicast request packet is valid. In operation 410, at least part of the header (e.g., message type 354) of the request packet is processed and a discovery protocol reply packet may be generated and sent to the requesting network device.

Figure 5:
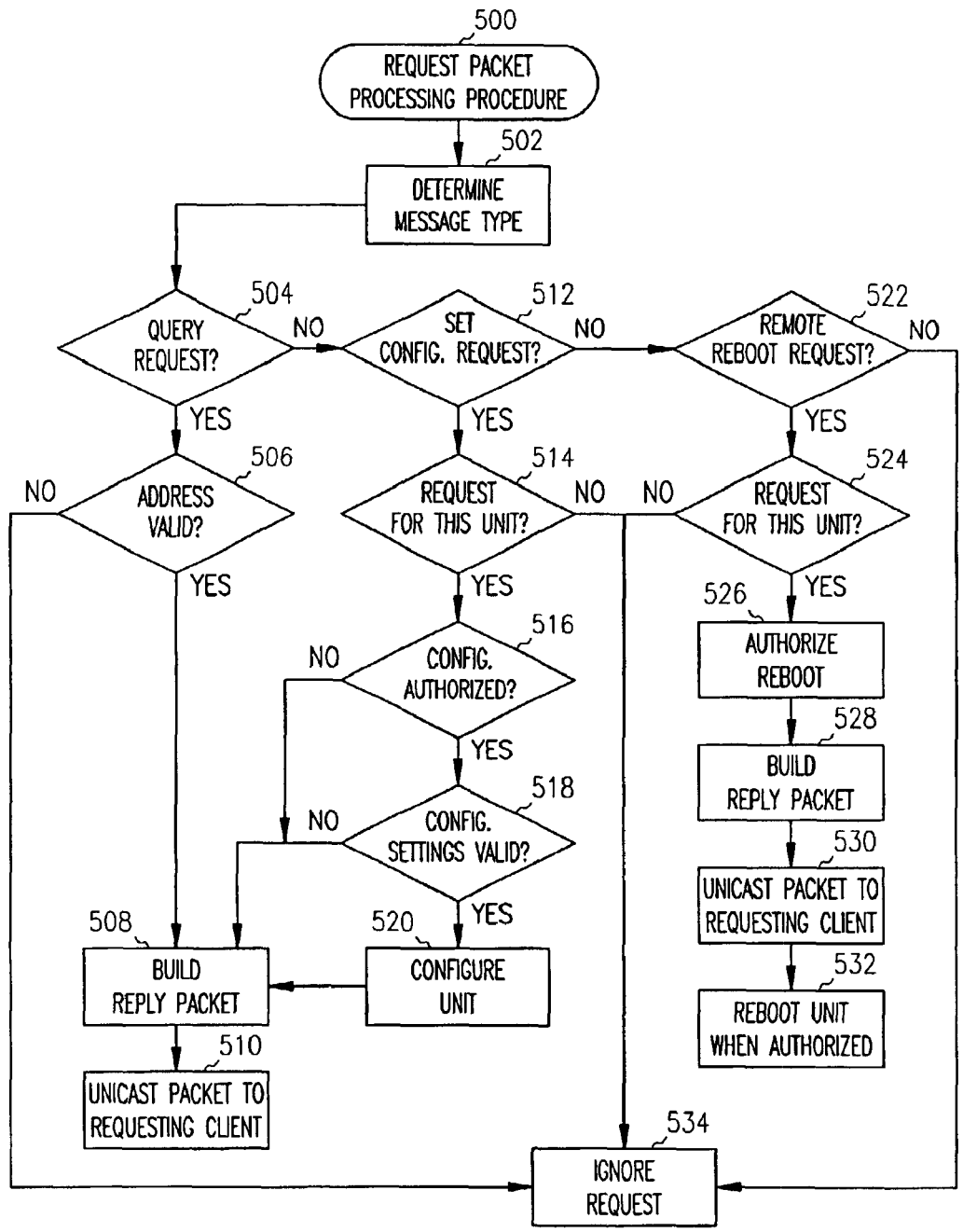
FIG. 5 is a flow chart of a discovery protocol request packet processing procedure in accordance with an embodiment of the present invention.

FIG. 5 is a flow chart of a discovery protocol request packet processing procedure in accordance with an embodiment of the present invention. Procedure 500 may be performed as part of operation 410 (FIG. 4) for processing a received and initially validated a discovery protocol request packet. Procedure 500 may be performed by a network device, such as network device 200 (FIG. 2) although other devices may be suitable. Although the individual operations of procedure 500 are illustrated and described as separate operations, one or more of the individual operations may be performed concurrently and nothing requires that the operations be performed in the order illustrated.

In operation 502, the message type may be determined from a message type field of the received discovery protocol packet. When the message type field indicates the packet is a query request 504, operation 506 may be performed. When the message type field indicates the packet is a set configuration parameter request 512, operation 514 may be performed. When the message type field indicates the packet is a remote reboot request 522, operation 524 may be performed. When the message type field is not recognized, the request packet may be ignored in operation 534 and the server element may continue to listen for other discovery protocol multicast request packets in operation 406 (FIG. 4) of procedure 400 (FIG. 4).

In operation 506, the server element may check to see if the request is intended to be processed by this particular network device. This is because, in some embodiments, many network devices may be configured to listen for the same multicast address. In one embodiment, server element 216 (FIG. 2) may compare a MAC address included in a data portion of the multicast packet, against an "all devices" address (e.g., 0xFFFFFFFFFFFF) or against the network device's manufacturing assigned MAC address to validate the address in operation 506. In operations 514 and 524, the network device may determine whether the request packet is for the particular network device. In one embodiment, operations 514 and 524 may include comparing the MAC address included in a data portion of the multicast packet against the network device's manufacturing assigned MAC address to validate the address of the request. When the address is determined to be invalid in either of operations 506, 514 or 524, the request packet may be ignored in operation 534 and the server element may continue to listen for other discovery protocol multicast request packets in operation 406 (FIG. 4) of procedure 400 (FIG. 4). When the address is determined to be valid in either of operations 506, 514 or 524, the request packet may be intended for that particular network device.

In operation 508, a response packet is built and unicasted to the requesting client in operation 510. In the case of a reply to a query request, the reply packet may include requested network configuration parameters.

After operation 514 determines that the request packet is intended for the network device, operation 516 may authorize the configuration request. A password, which may be encrypted, included in the request packet may be used for authorization. If unauthorized, a reply packet may be built in operation 508 informing the requesting client that it does not have authorization for the configuration set request.

Operation 518 determines whether the configuration settings received in a configuration request packet are valid configuration settings for the network device. When the configuration settings are invalid, a reply packet is built in operation 508 indicating that the configuration settings are invalid which is unicasted to the requesting client element in operation 510. When operation 518 determines that the received configuration settings are valid, operation 520 may configure the network device in accordance with the received configuration settings, and a reply packet may be built in operation 508 indicating whether or not the configuration was successful.

After operation 524 determines that the request packet is intended for the network device, operation 526 may authorize the reboot request. A password, which may be encrypted, included in the request packet may used for this authorization. If unauthorized, a reply packet may be built in operation 528 informing the requesting client that it does not have authorization for the reboot request. If the reboot request is authorized, a reply packet indicating that the device will be rebooted may be built in operation 528.

In operation 530, the discovery protocol reply packet built in operation 528 may be unicast to the requesting client. In operation 532, the network device may be rebooted when authorized in operation 526.

Figure 6:
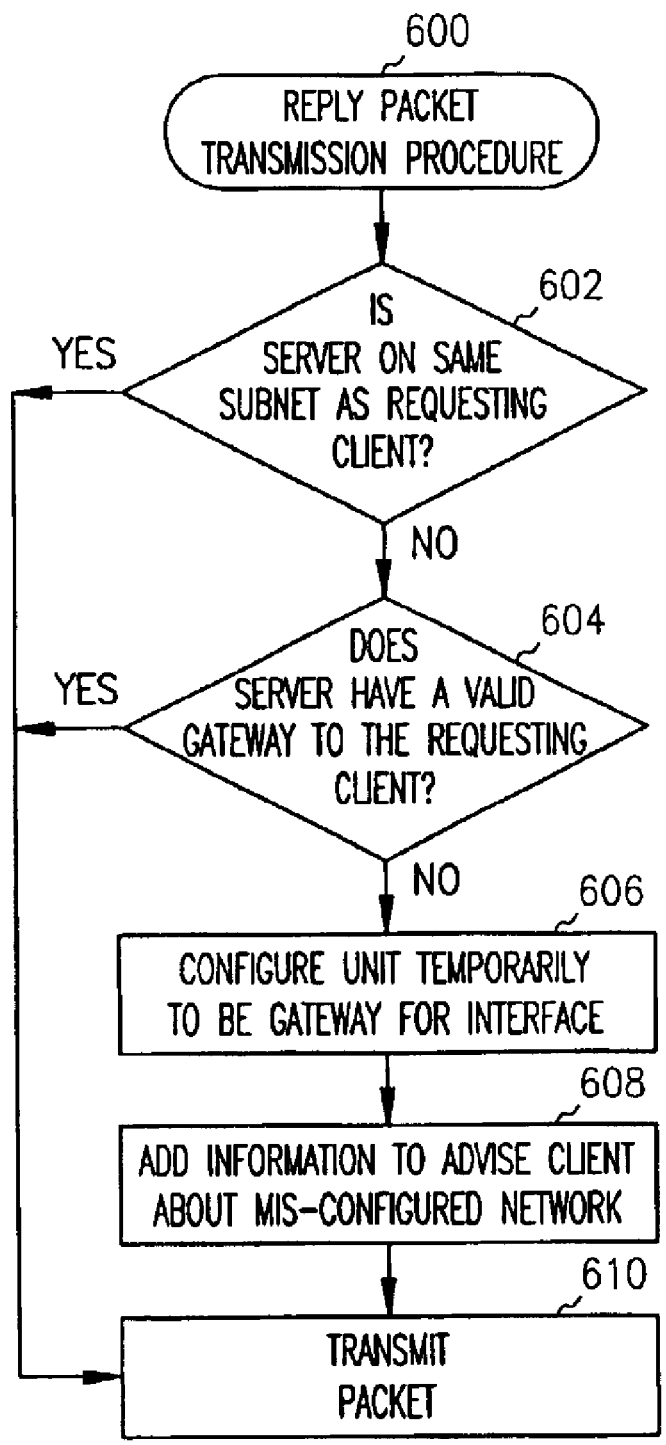
FIG. 6 is a flow chart of a discovery protocol reply packet transmission procedure in accordance with an embodiment of the present invention.

FIG. 6 is a flow chart of a discovery protocol reply packet transmission procedure in accordance with an embodiment of the present invention. Discovery protocol reply packet transmission procedure 600 may be performed by a server element, such as server element 216 of network device 200 (FIG. 2). Procedure 600 may be performed as part of operations 510 and/or 530 of procedure 500 (FIG. 5) to advise a requesting client that the network device may be misconfigured. Although the individual operations of procedure 600 are illustrated and described as separate operations, one or more of the individual operations may be performed concurrently and nothing requires that the operations be performed in the order illustrated.

In operation 602, the server element determines whether its network device is on the same subnet as the requesting client. Operation 602 may be performed by comparing a source address and subnet mask of the request packet from the requesting client with the current address and subnet mask of the network device, if one is assigned. The reply packet may be transmitted in operation 610 when operation 602 determines that the server element is on the same subnet as the requesting client.

In operation 604, the server element determines whether it has valid gateway access to the requesting client. In this case, the requesting client and replying server element may be on different subnets. Operation 604 may include requesting this information from the gateway. The reply packet may be transmitted in operation 610 when operation 604 determines that the server element has a valid gateway to the requesting client.

Operation 606 is performed when the server element believes its network device is misconfigured and may include temporarily configuring itself as a gateway by setting its default gateway address as its own address. In operation 608, an indicator may be added to the reply packet to indicate that it is misconfigured and the reply packet may be transmitted in operation 610.

Thus, a method and apparatus have been described that can discover and configure network devices. Also, a method and apparatus have been described that can communicate with and configure a network device that does not have an assigned IP address. Also, a method and apparatus have been described that can communicate with and configure a remote network device that may be misconfigured. Also, a method and apparatus have been described that can communicate with and configure a remote network device without a direct connection, such as a serial connection, to the network device. Also, a method and apparatus have been described that can determine configuration settings of a remote network device. Also, a method and apparatus have been described that can reboot a remote network device.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method to permit discovery and configuration of an unconfigured remotely located network server element without a network address by a client device, wherein the client device sends a multicast discovery protocol request packet, the method comprising:

monitoring packets received at a pre-configured discovery protocol port of the server element for the discovery protocol request packet;

when the discovery protocol request packet is received at the discovery protocol port, validating the discovery protocol request packet by comparing a portion of a header with a predetermined value;

when the discovery protocol request packet is valid, performing an action requested by the discovery protocol request packet; and unicasting, by the unconfigured server element, a discovery protocol reply packet to the client device indicating a response to the requested action, wherein the unicasted discovery protocol reply packet has a broadcast address as a source address.

2. A method to permit discovers and configuration of a remotely located network server element by a client device, wherein the client device sends a multicast discovery protocol request packet, the method comprising:

monitoring packets received at a pre-configured discovery protocol port of the server for the discovery protocol request packet;

when the discovery protocol request packet is received at the discovery protocol port, validating the discovery protocol request packet by comparing a portion of a header with a predetermined value;

when the discovery protocol request packet is valid, performing an action requested by the discovery protocol request packet;

unicasting a discovery protocol reply packet to the client device indicating a response to the requested action; and determining, when the discovery protocol request packet is valid, whether the action requested is a query request, a configuration request, or a remote reboot request based on a message type portion of the header of the discovery protocol request packet, and wherein unicasting comprises unicasting the discovery protocol reply packet to the client device, the discovery protocol reply packet indicating one of either:

information requested by the query request;

whether a configuration was performed in accordance with the configuration request; or whether the server element agrees to reboot in accordance with the remote reboot request.

3. The method of claim 2 wherein for the configuration request, or the remote reboot request, the method includes further validating the discovery protocol request packet by comparing a MAC address identified in the discovery protocol request packet with a MAC address of the server element, and wherein for the query request, the method includes further validating the discovery protocol request packet by comparing the MAC address identified in the discovery protocol request packet with either the MAC address of the server element or a predetermined broadcast address.

4. The method of claim 3 wherein for the configuration request, or the remote reboot request, the method further includes authorizing the request by comparing a password received in the discovery protocol request packet with a corresponding password stored in the server element.

5. The method of claim 4 wherein for the query request, the method further comprises generating the discovery protocol reply packet to include current configuration of the server element.

6. The method of claim 5 wherein the current configuration information includes at least one of a MAC address, an IP address, a gateway address, a domain name, hardware information or software information of the server element.

7. The method of claim 4 wherein for the configuration request, the method further comprises:

validating configuration information received in the discovery protocol request packet as valid configuration settings;

configuring the server element in accordance with the configuration information when valid; and generating the discovery protocol reply packet to indicate whether configuring the server element was performed.

8. The method of claim 7 wherein the configuration information includes at least one of an IP address, subnet mask or gateway address.

9. The method of claim 4 wherein for the remote reboot request, the method further comprises:

generating the discovery protocol reply packet to indicate whether the server element agrees to reboot; and rebooting after unicasting the discovery protocol reply packet.

10. A method to permit discovery and configuration of a remotely located network server element by a client device, wherein the client device sends a multicast discovery protocol request packet, the method comprising:

monitoring packets received at a pre-configured discovery protocol port of the server element for the discovery protocol request packet;

when the discovery protocol request packet is received at the discovery protocol port, validating the discovery protocol request packet by comparing a portion of a header with a predetermined value;

when the discovery protocol request packet is valid, performing an action requested by the discovery protocol request packet; and unicasting a discovery protocol reply packet to the client device indicating a response to the requested action, wherein prior to unicasting the discovery protocol reply packet, the method further comprises:

temporarily configuring the server element as a gateway when an IP address of the server element is not on the same subnet as the requesting client, and the server element has no valid gateway access to the requesting client; and providing an indication in the discovery protocol reply packet that the server element is misconfigured.

11. A method to permit discovery and configuration of a remotely located network server element by a client device, wherein the client device sends a multicast discovery protocol request packet, the method comprising:

monitoring packets received at a pre-configured discovery protocol port of the server element for the discovery protocol request packet;

when the discovery protocol request packet is received at the discovery protocol port, validating the discovery protocol request packet by comparing a portion of a header with a predetermined value;

when the discovery protocol request packet is valid, performing an action requested by the discovery protocol request packet; and unicasting a discovery protocol reply packet to the client device indicating a response to the requested action, wherein monitoring includes checking the multicast address and a UDP port number of received packets for a predetermined multicast address and predetermined UDP port number, the predetermined UDP port number corresponding with the pre-configured discovery protocol port.

12. A method to permit discovery and configuration of a remotely located network server element by a client device, wherein the client device sends a multicast discovery protocol request packet, the method comprising:

monitoring packets received at a pre-configured discovery protocol port of the server element for the discovery protocol request packet;

when the discovery protocol request packet is received at the discovery protocol port, validating the discovery protocol request packet by comparing a portion of a header with a predetermined value;

when the discovery protocol request packet is valid, performing an action requested by the discovery protocol request packet; and unicasting a discovery protocol reply packet to the client device indicating a response to the requested action, wherein validating comprises comparing a magic cookie portion of the header with a predetermined magic cookie stored in the server element.

13. A method to permit discovery and configuration of a remotely located network server element by a client device, wherein the client device sends a multicast discovery protocol request packet, the method comprising:

monitoring packets received at a pre-configured discovery protocol port of the server element for the discovery protocol request packet;

when the discovery protocol request packet is received at the discovery protocol port, validating the discovery protocol request packet by comparing a portion of a header with a predetermined value;

when the discovery protocol request packet is valid, performing an action requested by the discovery protocol request packet; and unicasting a discovery protocol reply racket to the client device indicating a response to the requested action, wherein validating the received packet further comprises comparing a measured length of the received discovery protocol request packet with an expected packet length, the expected packet length being determined from length information in a data length field of the header added with a length of the header.

14. A method to permit discovery and configuration of a remotely located network server element by a client device, wherein the client device sends a multicast discovery protocol request packet, the method comprising:

monitoring packets received at a pre-configured discovery protocol port of the server element for the discovery protocol request packet;

when the discovery protocol request packet is received at the discovery protocol port, validating the discovery protocol request packet by comparing a portion of a header with a predetermined value;

when the discovery protocol request packet is valid, performing an action requested by the discovery protocol request packet; and unicasting a discovery protocol reply packet to the client device indicating a response to the requested action, wherein the server element initially registers with a gateway to permit receipt of multicast packets in accordance with a discovery protocol, the multicast packets having a predetermined multicast address and indicating predetermined UDP port number, and wherein the server element binds with a UDP port of a network device for receipt of multicast packets in accordance with the discovery protocol.

15. The method of claim 14 wherein registering includes registering with an Internet group management protocol (IGMP) to permit receipt of multicast communications behind a router in accordance with the discovery protocol, and wherein binding includes binding the UDP port of a predetermined port number to enable communications between a TCP/IP stack of the network device for packets having a multicast address and a UDP port number for the discovery protocol.

16. A network device to operate a discovery protocol server element comprising:

a network interface to communicate packets with a network; and a processing element to configure a discovery protocol port of the network device and monitor packets received at the configured discovery protocol port for a discovery protocol request packet, wherein the network device is without a network address, and wherein when the discovery protocol request packet is received at the discovery protocol port, the processing element to validate the discovery protocol request packet by comparing a portion of a header with a predetermined value, and perform an action requested by the discovery protocol request packet, the network interface of the unconfigured server element to transmit a unicast discovery protocol reply packet to a client device indicating a response to the requested action, wherein the unicast discovery protocol reply packet has a broadcast address as a source address.

17. A network device to operate a discovery protocol server element comprising:

a network interface to communicate packets with a network; and a processing element to configure a discovery protocol port of the network device and monitor packets received at the configured discovery protocol port for a discovery protocol request packet, wherein when the discovery protocol request packet is received at the discovery protocol port, the processing element to validate the discovery protocol request packet by comparing a portion of a header with a predetermined value, and perform an action requested by the discovery protocol request packet, the network interface to transmit a unicast discovery protocol reply packet to a client device indicating a response to the requested action, wherein the processing element is to determine when the discovery protocol request packet is valid, whether the action requested is a query request, a configuration request, or a remote reboot request based on a message type portion of the header of the discovery protocol request packet, and wherein the network interface unicasts the discovery protocol reply packet to the client device, the discovery protocol reply packet indicating one of either:

information requested by the query request;

whether a configuration was performed in accordance with the configuration request; or whether the server element agrees to reboot the network device in accordance with the remote reboot request.

18. The device of claim 17 wherein for the configuration request, or the remote reboot request, the processor validates the discovery protocol request packet by comparing a MAC address identified in the discovery protocol request packet with a MAC address of the server element, and wherein for the query request, the processor validates the discovery protocol request packet by comparing the MAC address identified in the discovery protocol request packet with either the MAC address of the server element or a predetermined broadcast address.

19. A network device to operate a discovery protocol server element comprising:

a network interface to communicate packets with a network; and a processing element to configure a discovery protocol port of the network device and monitor packets received at the configured discovery protocol port for a discovery protocol request packet, wherein when the discovery protocol request packet is received at the discovery protocol port, the processing element to validate the discovery protocol request packet by comparing a portion of a header with a predetermined value, and perform an action requested by the discovery protocol request packet, the network interface to transmit a unicast discovery protocol reply packet to a client device indicating a response to the requested action, wherein prior to the network interface unicasting the discovery protocol reply packet, the server element is temporarily configured as a gateway when an IP address of the server element is not on the same subnet as the requesting client, and the server element has no valid gateway access to the requesting client, the discovery protocol reply packet including an indication that the server element is misconfigured.

20. A network device to operate a discovery protocol server element comprising:

a network interface to communicate packets with a network; and a processing element to configure a discovery protocol port of the network device and monitor packets received at the configured discovery protocol port for a discovery protocol request packet, wherein when the discovery protocol request packet is received at the discovery protocol port, the processing element to validate the discovery protocol request packet by comparing a portion of a header with a predetermined value, and perform an action requested by the discovery protocol request packet, the network interface to transmit a unicast discovery protocol reply packet to a client device indicating a response to the requested action, wherein the processor checks a multicast address and a UDP port number of received packets for a predetermined multicast address and predetermined UDP port number, the predetermined UDP port number corresponding with the pre-configured discovery protocol port.

21. An article comprising a storage medium having stored thereon instructions, that when executed by a computing platform, result in:

monitoring packets received at a pre-configured discovery protocol port of a server element for a discovery protocol request packet, the server element being unconfigured without a network address;

when the discovery protocol request packet is received at the discovery protocol port, validating the discovery protocol request packet by comparing a portion of a header with a predetermined value;

when the discovery protocol request packet is valid, performing an action requested by the discovery protocol request packet; and unicasting a discovery protocol reply packet to the client device indicating a response to the requested action, wherein the unicast discovery protocol reply packet has a broadcast address as a source address.

22. An article comprising a storage medium having stored thereon instructions, that when executed by a computing platform, result in:

monitoring packets received at a pre-configured discovery protocol port of a server element for a discovery protocol request packet;

when the discovery protocol request packet is received at the discovery protocol port, validating the discovery protocol request packet by comparing a portion of a header with a predetermined value;

when the discovery protocol request packet is valid, performing an action requested by the discovery protocol request packet;

unicasting a discovery protocol reply packet to the client device indicating a response to the requested action; and determining, when the discovery protocol request packet is valid, whether the action requested is a query request, a configuration request, or a remote reboot request based on a message type portion of the header of the discovery protocol request packet, and wherein unicasting comprises unicasting the discovery protocol reply packet to the client device, the discovery protocol reply packet indicating one of either:

information requested by the query request;

whether a configuration was performed in accordance with the configuration request; or whether the server element agrees to reboot in accordance with the remote reboot request.

23. The article as claimed in claim 22 wherein prior to unicasting the discovery protocol reply packet, the instructions, when further executed by the digital computing platform further result in:

temporarily configuring the server element as a gateway when an IP address of the server element is not on the same subnet as the requesting client, and the server element has no valid gateway access to the requesting client; and providing an indication in the discovery protocol reply packet that the server element is misconfigured.

24. The article as claimed in claim 23 wherein the article is a computer readable medium having program instructions stored thereon.

25. A method of determining configuration of a remotely located network server element by a client device, wherein the client device sends a multicast discovery protocol request packet, the method comprising:

monitoring packets received at a pre-configured discovery protocol port of the server element for the discovery protocol request packet;

when the discovery protocol request packet is valid, performing an action requested by the discovery protocol request packet; and unicasting a discovery protocol reply packet to the client device indicating a response to the requested action; and validating the discovery protocol request packet by comparing the MAC address identified in the discovery protocol request packet with a predetermined broadcast address, wherein the server element initially registers with a gateway to permit receipt of multicast packets in accordance with a discovery protocol, the multicast packets having a predetermined multicast address and indicating predetermined UDP port number, and the server element binds with a UDP port of a network device for receipt of multicast packets in accordance with the discovery protocol.

26. The method of claim 25 wherein the server element registers with an Internet group management protocol (IGMP) to permit receipt of multicast communications behind a router in accordance with the discovery protocol, and wherein the server elements binds with the UDP port of a predetermined port number to enable communications between a TCP/IP stack of the network device for packets having a multicast address and a UDP port number for the discovery protocol, and wherein the discovery protocol reply packet to include current configuration of the server element, the current configuration information includes at least one of a MAC address, an IP address, a gateway address, a domain name, hardware information or software information of the server element.

27. A method of configuring of a misconfigured remotely located network server element by a client device, wherein the client device sends a multicast discovery protocol request packet, the method comprising:

monitoring packets received at a pre-configured discovery protocol port of the server element for the discovery protocol request packet;

when the discovery protocol request packet is received at the discovery protocol port, validating the discovery protocol request packet by comparing a portion of a header with a predetermined value;

validating configuration information received in the discovery protocol request packet as valid configuration settings;

configuring the server element in accordance with the configuration information when valid;

generating the discovery protocol reply packet to indicate whether configuring the server element was performed; and unicasting a discovery protocol reply packet to the client device indicating a response to the requested action, wherein the configuration information includes at least one of an IP address, subnet mask or gateway address.

28. The method of claim 27 further comprising:

the server element initially registering with a gateway to permit receipt of multicast packets in accordance with a discovery protocol, the multicast packets having a predetermined multicast address and indicating predetermined UDP port number; and the server element binding with a UDP port of a network device for receipt of multicast packets in accordance with the discovery protocol.

* * * * *

UNITED STATES PATENT AND TRADEMARK OFFICE
CERTIFICATE OF CORRECTION

PATENT NO.       : 7,035,257 B2                              Page 1 of 1
APPLICATION NO.  : 10/295268
DATED            : April 25, 2006
INVENTOR(S)      : Vafaei It is certified that error appears in the above-identified patent and that said Letters Patent is hereby corrected as shown below:

On the Title page, in Item (56), under References Cited, "other Publications", in column 1, line 3, delete "900000248" and insert - - 90000248 - -, therefor.

On the Title page, in Item (56), under References Cited, "Other Publications", in column 1, line 3, delted "C/9200038" and insert - - C/92000308 - -, therefor.

In column 3, line 5, after "invention" insert - - ; - -.

In column 5, line 51, delete "(LANA)." and insert - - (IANA). - -, therefor.

In column 6, line 6, delete "requester," and insert - - requestor, - -, therefor.

In column 6, line 33, delete "requester," and insert - - requestor, - -, therefor.

In column 8, line 34, delete "be" and insert - - been - -, therefor.

In column 13, line 59, delete "discovers" and insert - - discovery - -, therefor.

In column 16, line 15, delete "racket" and insert - - packet - -, therefor.

Signed and Sealed this

First Day of August, 2006

JON W. DUDAS
*Director of the United States Patent and Trademark Office*